US012424137B2

(12) United States Patent
Yamazaki

(10) Patent No.: US 12,424,137 B2
(45) Date of Patent: Sep. 23, 2025

(54) DISPLAY DRIVER AND DISPLAY APPARATUS

(71) Applicant: LAPIS Technology Co., Ltd., Yokohama (JP)

(72) Inventor: Koji Yamazaki, Yokohama (JP)

(73) Assignee: LAPIS Technology Co., Ltd., Yokohama (JP)

( * ) Notice: Subject to any disclaimer, the term of this patent is extended or adjusted under 35 U.S.C. 154(b) by 0 days.

(21) Appl. No.: 18/601,526

(22) Filed: Mar. 11, 2024

(65) Prior Publication Data

US 2024/0312386 A1 Sep. 19, 2024

(30) Foreign Application Priority Data

Mar. 16, 2023 (JP) .................................. 2023-42000

(51) Int. Cl.
*G09G 3/20* (2006.01)

(52) U.S. Cl.
CPC ..... *G09G 3/2007* (2013.01); *G09G 2310/027* (2013.01); *G09G 2310/0291* (2013.01); *G09G 2320/0276* (2013.01); *G09G 2330/021* (2013.01); *G09G 2330/028* (2013.01)

(58) Field of Classification Search
CPC .. G09G 3/2007; G09G 3/3688; G09G 3/3696; G09G 2310/027; G09G 2310/0291; G09G 2320/0276; G09G 2330/021; G09G 2330/028
See application file for complete search history.

(56) References Cited

U.S. PATENT DOCUMENTS

| | | | | |
|---|---|---|---|---|
| 7,102,632 B2 * | 9/2006 | Siwinski | .............. | G09G 3/3225 345/212 |
| 9,905,167 B2 * | 2/2018 | Jeon | ........................ | G09G 5/008 |
| 2002/0063674 A1 * | 5/2002 | Chiang | ................ | G09G 3/3688 345/98 |
| 2011/0164020 A1 * | 7/2011 | Cho | ......................... | G09G 3/20 345/211 |

(Continued)

FOREIGN PATENT DOCUMENTS

JP 2007286525 A 11/2007

*Primary Examiner* — Mihir K Rayan
(74) *Attorney, Agent, or Firm* — VOLENTINE, WHITT & FRANCOS, PLLC; Adam C. Volentine

(57) ABSTRACT

A display driver includes a plurality of DA conversion circuits, amplifiers, and a switch circuit. Each of the DA conversion circuits outputs a gradation reference voltage in a gradation reference voltage group generated by one of gradation reference voltage generating circuits as a gradation voltage. The amplifiers each output a voltage output a voltage obtained by amplifying each gradation voltage as an output voltage. The switch circuit receives an output voltage group output from the amplifiers and a gradation voltage group generated by the respective DA conversion circuits coupled to a specific gradation reference voltage generating circuit. The switch circuit outputs the output voltage group to the display panel when a normal display mode while outputting the gradation voltage group to the display panel when a monochromatic display mode. At this time, when the monochromatic display mode, operation of the amplifiers and each gradation reference voltage generating circuit excluding the specific gradation reference voltage generating circuit is stopped.

6 Claims, 10 Drawing Sheets

(56) References Cited

U.S. PATENT DOCUMENTS

| | | | | |
|---|---|---|---|---|
| 2015/0356898 | A1* | 12/2015 | Jeon | G09G 3/3275 345/690 |
| 2017/0309219 | A1* | 10/2017 | Kong | G09G 3/2003 |
| 2019/0164466 | A1* | 5/2019 | Sugihara | G09G 3/3685 |

* cited by examiner

DISPLAY DRIVER AND DISPLAY APPARATUS

CROSS-REFERENCE TO RELATED APPLICATION

This application is based upon and claims the benefit of priority from the prior Japanese Patent Application No. 2023-042000 filed on Mar. 16, 2023, the entire contents of which are incorporated herein by reference.

1. TECHNICAL FIELD

The disclosure relates to a display driver that drives a display panel corresponding to a video signal and a display apparatus.

2. DESCRIPTION OF THE RELATED ART

Portable information terminals such as smartphones are equipped with a liquid crystal or organic EL display apparatus. Such a display apparatus is generally constituted of a liquid crystal or organic EL display panel and a display driver that drives the display panel based on a video signal and displays this image.

The display driver includes a DA converter that converts each pixel data piece representing a luminance level of each pixel based on a video signal to a gradation voltage having a voltage value corresponding to the luminance level and a plurality of output amplifiers that supply a plurality of output voltages obtained by respectively and individually amplifying a plurality of gradation voltages to data lines of the display panel (for example, see JP-A-2007-286525).

Since portable information terminals equipped with a display apparatus, such as smartphones, operate on batteries, lower power consumption is desired to extend a continuous operating time.

In particular, in recent years, in association with an enhancement in image quality (high definition, high gradation, and high-speed driving) of a screen of the display apparatus, an increase in power consumed by the display apparatus is a problem.

Therefore, an objective of the disclosure is to provide a display driver and a display apparatus that allow a reduction in power consumption.

SUMMARY

A display driver according to the disclosure drives a display panel including a plurality of data lines according to a pixel data piece representing a luminance level of each pixel based on a video signal. The display driver includes a plurality of gradation reference voltage generating circuits, first to m-th (m is an integer of three or more) DA conversion circuits, first to m-th amplifiers, and a switch circuit. The plurality of gradation reference voltage generating circuits each generate a voltage group according to gamma correction characteristics of a different color component as a gradation reference voltage group. The first to m-th DA conversion circuits are each coupled to one gradation reference voltage generating circuit among the plurality of gradation reference voltage generating circuits. Each of the first to m-th DA conversion circuits selecting a gradation reference voltage corresponding to a luminance level represented by the pixel data piece from a gradation reference voltage group and outputting the gradation reference voltage as a gradation voltage. The gradation reference voltage group is generated by the gradation reference voltage generating circuit coupled to each of the first to m-th DA conversion circuits itself. The first to m-th amplifiers each output a voltage obtained by individually amplifying the gradation voltage output from each of the first to m-th DA conversion circuits as an output voltage. The switch circuit receives an output voltage group, a gradation voltage group, and a display mode signal. The output voltage group is constituted of the output voltage output from each of the first to m-th amplifiers. The gradation voltage group is constituted of the gradation voltage output from each of DA conversion circuits among the first to m-th DA conversion circuits. The DA conversion circuits are coupled to a specific gradation reference voltage generating circuit among the plurality of gradation reference voltage generating circuits. The display mode signal indicates a monochromatic display or a normal display. The switch circuit outputs the output voltage group to the plurality of data lines of the display panel when the display mode signal indicates the normal display. The switch circuit outputs the gradation voltage group to the plurality of data lines of the display panel when the display mode signal indicates the monochromatic display. When the display mode signal indicates the monochromatic display, operation of the first to m-th amplifiers and each gradation reference voltage generating circuit excluding the specific gradation reference voltage generating circuit from among the plurality of gradation reference voltage generating circuits is stopped.

A display driver according to the disclosure drives a display panel including a plurality of data lines according to a pixel data piece representing a luminance level of each pixel based on a video signal. The display driver includes a plurality of gradation reference voltage generating circuits, first to m-th (m is an integer of three or more) DA conversion circuits, first to m-th amplifiers, and a wiring. The plurality of gradation reference voltage generating circuits each generate a voltage group according to gamma correction characteristics of a different color component as a gradation reference voltage group. The first to m-th DA conversion circuits are each coupled to one gradation reference voltage generating circuit among the plurality of gradation reference voltage generating circuits. Each of the first to m-th DA conversion circuits selecting a gradation reference voltage corresponding to a luminance level represented by the pixel data piece from a gradation reference voltage group and outputting the gradation reference voltage as a gradation voltage. The gradation reference voltage group is generated by the gradation reference voltage generating circuit coupled to each of the first to m-th DA conversion circuits itself. The first to m-th amplifiers each output a voltage obtained by individually amplifying the gradation voltage output from each of the first to m-th DA conversion circuits as an output voltage. The wiring transmits a predetermined gradation reference voltage of the gradation reference voltage group generated by a specific gradation reference voltage generating circuit among the plurality of gradation reference voltage generating circuits. The switch circuit receives an output voltage group, the predetermined gradation reference voltage received via the wiring, and a display mode signal. The output voltage group is constituted of the output voltage output from each of the first to m-th amplifiers. The display mode signal indicates a monochromatic display or a normal display. The switch circuit outputs the output voltage group to the plurality of data lines of the display panel when the display mode signal indicates the normal display. The switch circuit outputs the predetermined gradation reference voltage received via the wiring to the plurality of data lines of the display panel when the display mode signal indicates the monochromatic display. When the display mode signal indicates the monochromatic display, operation of the first to m-th amplifiers and each gradation reference voltage generating circuit excluding the specific gradation reference voltage generating circuit from among the plurality of gradation reference voltage generating circuits is stopped.

A display apparatus according to the disclosure includes a display panel and a display driver. The display panel includes a plurality of data lines. The display driver drives the display panel according to a pixel data piece representing a luminance level of each pixel based on a video signal. The display driver includes a plurality of gradation reference voltage generating circuits, first to m-th (m is an integer of three or more) DA conversion circuits, first to m-th amplifiers, and a switch. The plurality of gradation reference voltage generating circuits each generate a voltage group according to gamma correction characteristics of a different color component as a gradation reference voltage group. The first to m-th DA conversion circuits each coupled to one gradation reference voltage generating circuit among the plurality of gradation reference voltage generating circuits. Each of the first to m-th DA conversion circuits select a gradation reference voltage corresponding to a luminance level represented by the pixel data piece from a gradation reference voltage group and outputting the gradation reference voltage as a gradation voltage. The gradation reference voltage group is generated by the gradation reference voltage generating circuit coupled to each of the first to m-th DA conversion circuits itself. The first to m-th amplifiers each output a voltage obtained by individually amplifying the gradation voltage output from each of the first to m-th DA conversion circuits as an output voltage. The switch circuit receives an output voltage group, a gradation voltage group, and a display mode signal. The output voltage group is constituted of the output voltage output from each of the first to m-th amplifiers. The gradation voltage group is constituted of the gradation voltage output from each of DA conversion circuits among the first to m-th DA conversion circuits. The DA conversion circuits is coupled to a specific gradation reference voltage generating circuit among the plurality of gradation reference voltage generating circuits. The display mode signal indicates a monochromatic display or a normal display. The switch circuit outputs the output voltage group to the plurality of data lines of the display panel when the display mode signal indicates the normal display. The switch circuit outputs the gradation voltage group to the plurality of data lines of the display panel when the display mode signal indicates the monochromatic display. When the display mode signal indicates the monochromatic display, operation of the first to m-th amplifiers and each gradation reference voltage generating circuit excluding the specific gradation reference voltage generating circuit from among the plurality of gradation reference voltage generating circuits is stopped.

A display apparatus according to the disclosure includes a display panel and a display driver. The display panel includes a plurality of data lines. The display driver drives the display panel according to a pixel data piece representing a luminance level of each pixel based on a video signal. The display driver includes a plurality of gradation reference voltage generating circuits, first to m-th (m is an integer of three or more) DA conversion circuits, first to m-th amplifiers, a wiring, and a switch circuit. The plurality of gradation reference voltage generating circuits each generate a voltage group according to gamma correction characteristics of a different color component as a gradation reference voltage group. The first to m-th DA conversion circuits each coupled to one gradation reference voltage generating circuit among the plurality of gradation reference voltage generating circuits. Each of the first to m-th DA conversion circuits selecting a gradation reference voltage corresponding to a luminance level represented by the pixel data piece from a gradation reference voltage group and outputting the gradation reference voltage as a gradation voltage. The gradation reference voltage group is generated by the gradation reference voltage generating circuit coupled to each of the first to m-th DA conversion circuits itself. The first to m-th amplifiers each output a voltage obtained by individually amplifying the gradation voltage output from each of the first to m-th DA conversion circuits as an output voltage. The wiring transmits a predetermined gradation reference voltage of the gradation reference voltage group generated by a specific gradation reference voltage generating circuit among the plurality of gradation reference voltage generating circuits. The switch circuit receives an output voltage group, the predetermined gradation reference voltage received via the wiring, and a display mode signal. The output voltage group is constituted of the output voltage output from each of the first to m-th amplifiers. The display mode signal indicates a monochromatic display or a normal display. The switch circuit outputs the output voltage group to the plurality of data lines of the display panel when the display mode signal indicates the normal display. The switch circuit outputs the predetermined gradation reference voltage received via the wiring to the plurality of data lines of the display panel when the display mode signal indicates the monochromatic display. When the display mode signal indicates the monochromatic display, operation of the first to m-th amplifiers and each gradation reference voltage generating circuit excluding the specific gradation reference voltage generating circuit from among the plurality of gradation reference voltage generating circuits is stopped.

DETAILED DESCRIPTION

When the display driver according to the disclosure receives a display mode signal indicating a monochromatic display, the display driver supplies a gradation voltage group output from a DA conversion circuit group coupled to a specific gradation reference voltage generating circuit among a plurality of gradation reference voltage generating circuits to the display panel without using an amplifier group in a final stage. Furthermore, at this time, the operation of the amplifier group in the final stage as well as each of the other gradation reference voltage generating circuits excluding the above-described specific gradation reference voltage generating circuit is stopped.

This substantially reduces the power consumed by not only all the amplifiers in the final stage but also the gradation reference voltage generating circuits when the monochromatic display is performed, therefore allowing power saving of the display driver as well as the display apparatus including the display driver.

Embodiments of the disclosure will be described in detail with reference to the drawings below.

Figure 1:
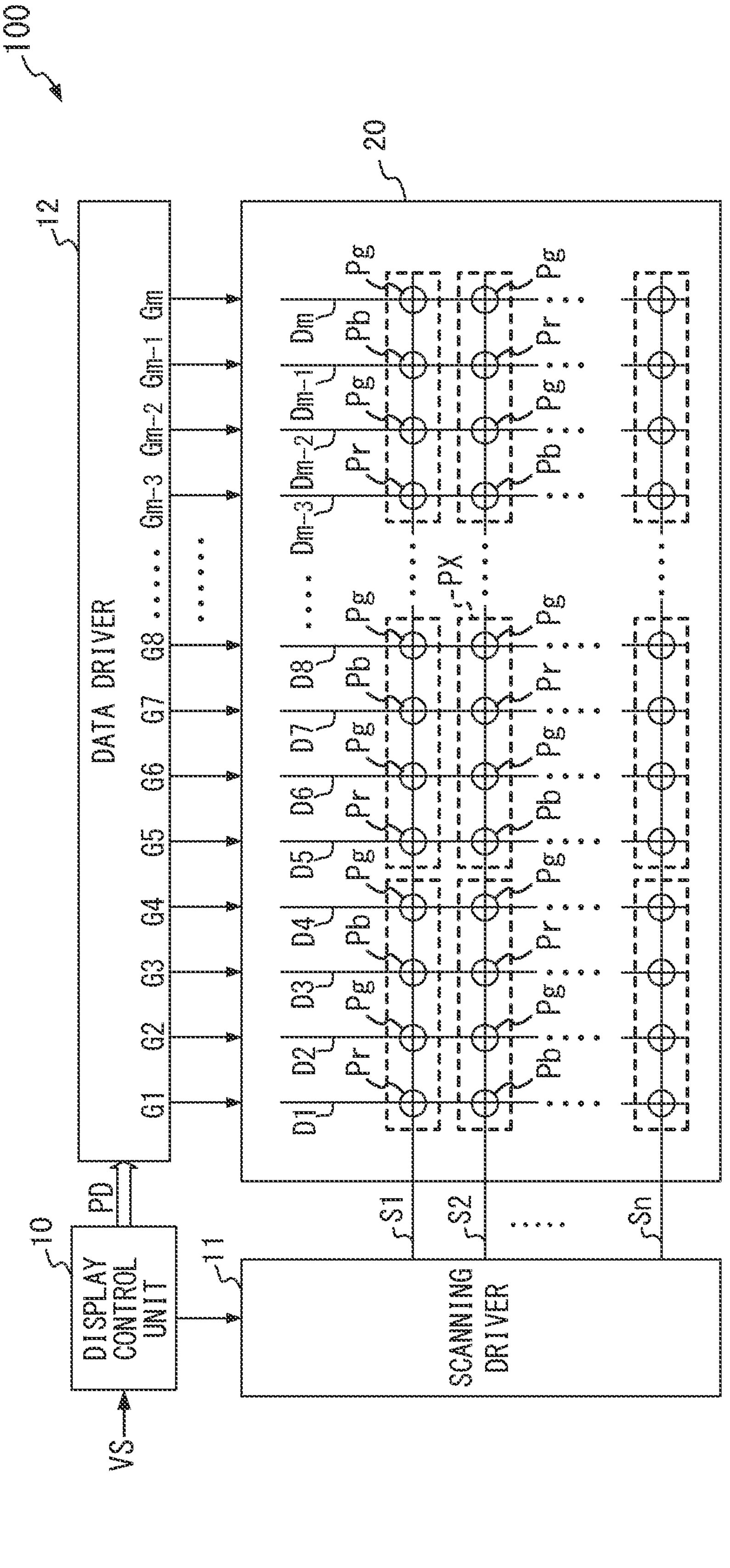
FIG. 1 is a block diagram illustrating a configuration of a display apparatus 100 including a display driver according to the disclosure.

FIG. 1 is a block diagram illustrating a configuration of a display apparatus 100 including a display driver according to the disclosure. As illustrated in FIG. 1, the display apparatus 100 includes a display control unit 10, a scanning driver 11, a data driver 12, and a display panel 20.

The display panel 20 includes n (n is an integer of two or more) horizontal scanning lines S1 to Sn that extend in a horizontal direction of a two-dimensional screen and m (m is an integer of two or more) data lines D1 to Dm that extend in a perpendicular direction of the two-dimensional screen. In regions of intersecting portions between the horizontal scanning lines S1 to Sn and the data lines D1 to Dm (regions encircled by circles), display cells for each color component necessary for color displays, such as red display cells Pr functioning for displaying a red color, green display cells Pg functioning for displaying a green color, or blue display cells Pb functioning for displaying a blue color, are formed.

In an example illustrated in FIG. 1, the display panel 20 of a PenTile system, in which four display cells adjacent to one another on each of the horizontal scanning lines S1 to Sn form one cell group PX (regions surrounded by dashed lines) corresponding to driving, is illustrated. At this time, the arrangement configuration of the four display cells in each cell group PX is, as illustrated in FIG. 1, an arrangement in which the red display cell Pr, the green display cell Pg, the blue display cell Pb, and the green display cell Pg are arranged side by side in this order on odd numbered horizontal scanning lines among the horizontal scanning lines S1 to Sn. On the other hand, on even numbered horizontal scanning lines, the arrangement configuration is an arrangement in which the blue display cell Pb, the green display cell Pg, the red display cell Pr, and the green display cell Pg are arranged side by side in this order.

The display control unit 10 receives various control signals including horizontal and perpendicular synchronization signals as well as a video signal VS representing a luminance level of each pixel by each of color components of a red color, a green color, and a blue color. The display control unit 10 generates a scanning signal according to a horizontal synchronization signal included in the video signal VS and supplies this to the scanning driver 11. Furthermore, the display control unit 10 generates a video data signal PD including the above-described various control signals as well as series of pixel data pieces representing the luminance levels in, for example, 8 bits for each of the red color, the green color, and the blue color based on the video signal VS and supplies the video data signal PD to the data driver 12.

The scanning driver 11 generates a scanning pulse according to the scanning signal supplied from the display control unit 10 and sequentially and alternatively applies this to the horizontal scanning lines S1 to Sn formed on the display panel 20.

The data driver 12 retrieves a series of m pixel data pieces, included in the video data signal PD, each at a time in accordance with the various control signals included in the video data signal PD and converts the respective pieces to driving voltage signals G1 to Gm having analog voltage values. The data driver 12 supplies the driving voltage signals G1 to Gm to the data lines D1 to Dm of the display panel 20.

Figure 2:
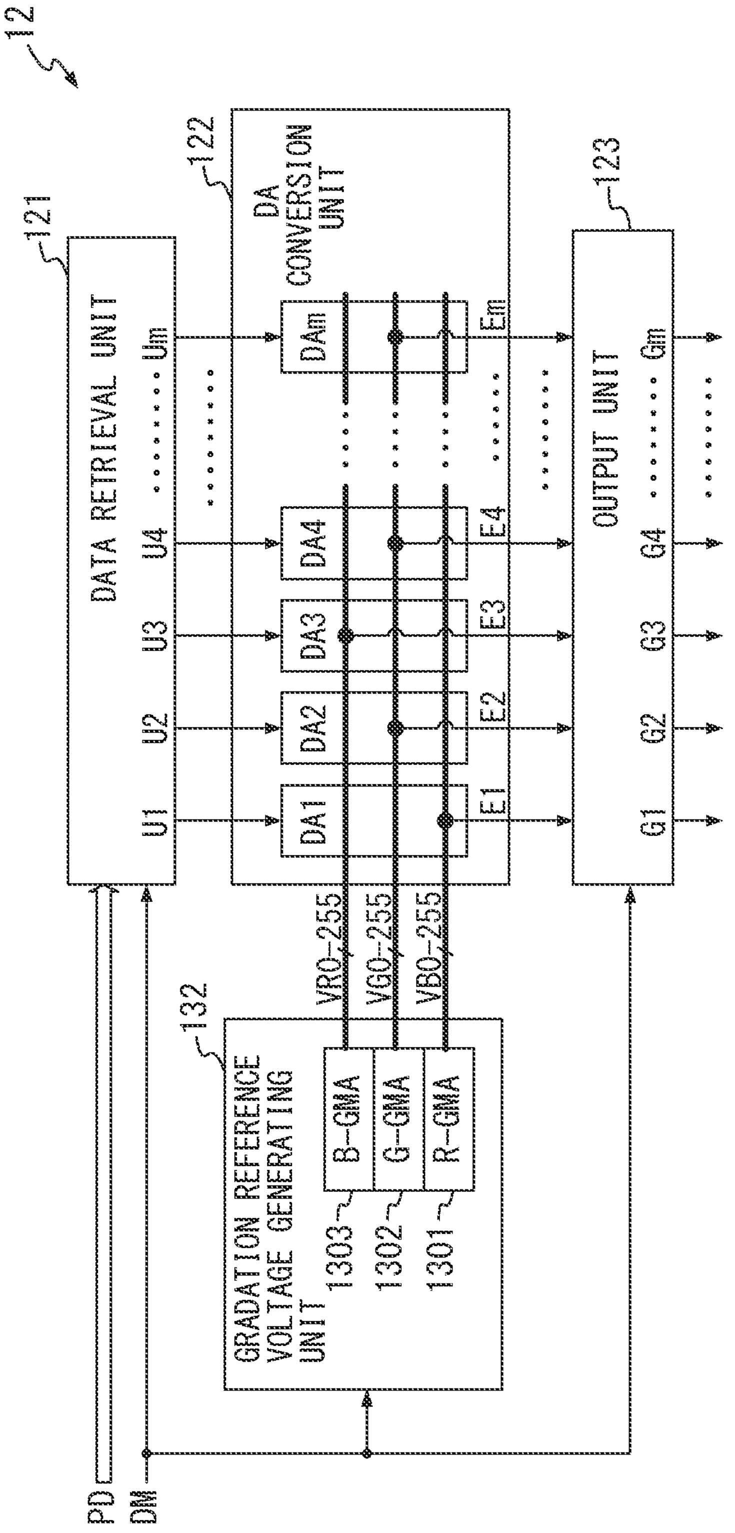
FIG. 2 is a block diagram illustrating an internal configuration of a data driver 12.

FIG. 2 is a block diagram illustrating an internal configuration of the data driver 12.

As illustrated in FIG. 2, the data driver 12 is constituted of a semiconductor IC chip including a data retrieval unit 121, a DA conversion unit 122, an output unit 123, and a gradation reference voltage generating unit 132.

The semiconductor IC chip has a rectangular circuit formation surface, and the gradation reference voltage generating unit 132 is arranged in the center of the circuit formation surface. Furthermore, each of the data retrieval unit 121, the DA conversion unit 122, and the output unit 123 is arranged in a configuration extending in a direction along one side of the circuit formation surface.

The data retrieval unit 121 receives a display mode signal DM, which indicates a normal display or a black display in binary (logical level 0 or 1), and when the display mode signal DM represents, for example, the logical level 0 indicating a normal display, the data retrieval unit 121 retrieves a series of m pixel data pieces, included in the video data signal PD, each at a time and supplies the respective pieces to the DA conversion unit 122 as pixel data U1 to Um. When the display mode signal DM represents, for example, the logical level 1 indicating a black display, the data retrieval unit 121 supplies the pixel data U1 to Um, each of which represents the minimum luminance level, to the DA conversion unit 122.

The gradation reference voltage generating unit 132 includes a red gamma gradation reference voltage generating circuit (hereinafter referred to as an R-GMA) 1301, a green gamma gradation reference voltage generating circuit (hereinafter referred to as a G-GMA) 1302, and a blue gamma gradation reference voltage generating circuit (hereinafter referred to as a B-GMA) 1303.

The R-GMA 1301 generates voltages for 256 gradations according to a gamma correction characteristic of a red color component as gradation reference voltages VR0 to VR255 and supplies them to the DA conversion unit 122. The G-GMA 1302 generates voltages for 256 gradations according to a gamma correction characteristic of a green color component as gradation reference voltages VG0 to VG255 and supplies them to the DA conversion unit 122. The B-GMA 1303 generates voltages for 256 gradations according to a gamma correction characteristic of a blue color component as gradation reference voltages VB0 to VB255 and supplies them to the DA conversion unit 122.

Figure 3A:
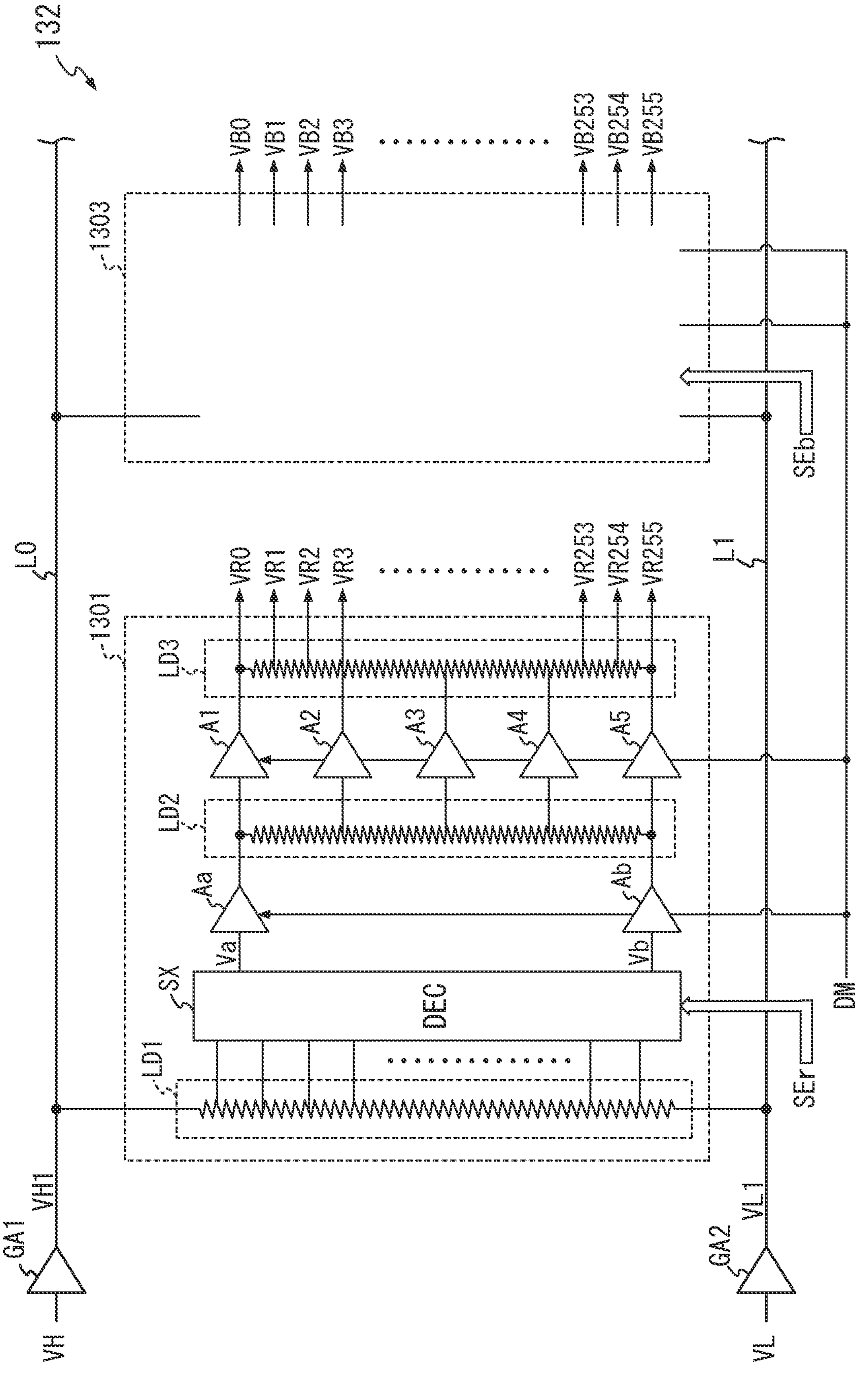
FIG. 3A is a circuit diagram illustrating a part of an internal configuration of a gradation reference voltage generating unit 132.
Figure 3B:
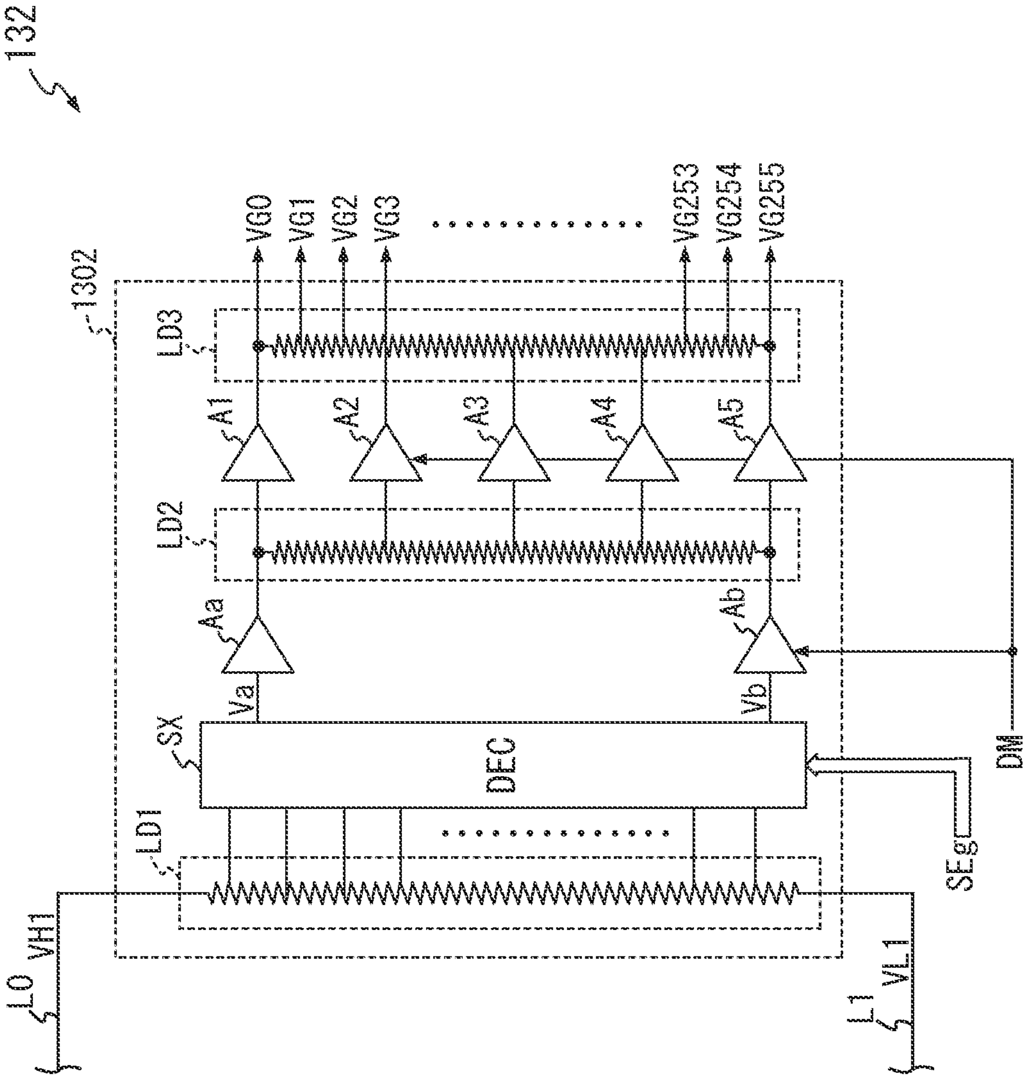
FIG. 3B is a circuit diagram illustrating another part of the internal configuration of the gradation reference voltage generating unit 132.

FIG. 3A and FIG. 3B are circuit diagrams illustrating an internal configuration of the gradation reference voltage generating unit 132.

As illustrated in FIG. 3A and FIG. 3B, the gradation reference voltage generating unit 132 includes amplifiers GA1 and GA2 and the R-GMA 1301, the G-GMA 1302, and the B-GMA 1303, each of which has the same circuit configuration.

Each of the R-GMA 1301, the G-GMA 1302, and the B-GMA 1303 includes first to third ladder resistors LD1 to LD3, a decoder SX, gamma amplifiers Aa and Ab, and gamma amplifiers A1 to A5.

In FIG. 3A and FIG. 3B, the amplifier GA1 receives a high power supply voltage VH, amplifies this to be a reference high voltage VH1, and supplies the reference high voltage VH1 to one end of the ladder resistor LD1 of each of the R-GMA 1301, the G-GMA 1302, and the B-GMA 1303 via a line L0. The amplifier GA2 receives a low power supply voltage VL, amplifies this to be a reference low voltage VL1, and supplies the reference low voltage VL1 to the other end of the ladder resistor LD1 of each of the R-GMA 1301, the G-GMA 1302, and the B-GMA 1303 via a line L1.

The ladder resistor LD1 supplies the decoder SX with a plurality of divided voltages divided between the reference high voltage VH1 and the reference low voltage VL1.

The decoder SX receives a selection signal SEr, SEg, or SEb that causes the decoder SX to select two divided voltages according to a gamma characteristic of the red, green, or blue color.

That is, the decoder SX of the R-GMA 1301 receives the selection signal SEr that causes the decoder SX to select two divided voltages according to the gamma characteristic of the red color, and the decoder SX of the G-GMA 1302 receives the selection signal SEg that causes the decoder SX to select two divided voltages according to the gamma characteristic of the green color. Further, the decoder SX of the B-GMA 1303 receives the selection signal SEb that causes the decoder SX to select two divided voltages according to the gamma characteristic of the blue color.

This causes the decoder SX to select two divided voltages indicated by the selection signal (SEr, SEg, or SEb) from among the plurality of divided voltages supplied from the ladder resistor LD1 and supplies one divided voltage to the gamma amplifier Aa as a gamma reference voltage Va and the other divided voltage to the gamma amplifier Ab as a gamma reference voltage Vb.

The gamma amplifier Aa supplies a voltage obtained by amplifying the gamma reference voltage Va to one end of the ladder resistor LD2 and the gamma amplifier A1 as a first reference voltage. The gamma amplifier Ab supplies a voltage obtained by amplifying the gamma reference voltage Vb to the other end of the ladder resistor LD2 and the gamma amplifier A5 as a second reference voltage.

The ladder resistor LD2 divides the first and second reference voltages received as described above and supplies voltages generated at its own three different taps to the gamma amplifiers A2 to A4 as first to third divided voltages, respectively.

The gamma amplifier A1 supplies the first reference voltage output from the gamma amplifier Aa to one end of the ladder resistor LD3. The gamma amplifier A5 supplies the second reference voltage output from the gamma amplifier Ab to the other end of the ladder resistor LD3. The gamma amplifiers A2 to A4 apply voltages obtained by individually receiving and amplifying the first to third divided voltages generated at the three taps of the ladder resistor LD2 as described above to three taps different from one another of the ladder resistor LD3.

The ladder resistor LD3 outputs a group of voltages generated at its own 256 taps by receiving a group of the voltages output from the gamma amplifiers A1 to A5 at the respective taps as described above as a gradation reference voltage group. That is, the ladder resistor LD3 of the R-GMA 1301 outputs the group of voltages generated at its own 256 taps as the gradation reference voltages VR0 to VR255. The ladder resistor LD3 of the G-GMA 1302 outputs a group of voltages generated at its own 256 taps as the gradation reference voltages VG0 to VG255. The ladder resistor LD3 of the B-GMA 1303 outputs a group of voltages generated at its own 256 taps as the gradation reference voltages VB0 to VB255.

Each of the gamma amplifiers Aa and Ab and gamma amplifiers A1 to A5 of each of the R-GMA 1301 and the B-GMA 1303 receive the above-described display mode signal DM and has its own power supply cut off when the display mode signal DM indicates a black display. This causes a current to stop flowing to the ladder resistors LD2 and LD3 and causes all the gradation reference voltages VR0 to VR255 and VB0 to VB255 to be 0 volts.

On the other hand, for the G-GMA 1302, as illustrated in FIG. 3B, each of the gamma amplifier Ab and gamma amplifiers A2 to A5 has its own power supply cut off according to the display mode signal DM indicating a black display. At this time, the gamma amplifier Aa and the gamma amplifier A1 of the G-GMA 1302 are excluded from amplifiers to be controlled for cutting off the power supply by the display mode signal DM indicating a black display. This causes a current to stop flowing to the ladder resistors LD2 and LD3 in the G-GMA 1302 by the display mode signal DM indicating a black display. However, the gamma amplifier Aa and the gamma amplifier A1 operate, thereby outputting only the gradation reference voltage VG0 corresponding to the minimum luminance level.

Thus, when the gradation reference voltage generating unit 132 receives the display mode signal DM indicating a black display, the power supply to the respective amplifiers (Aa, Ab, and A1 to A5) included in the R-GMA 1301 and the B-GMA 1303 is cut off, thereby entering a state where the operation of these R-GMA 1301 and B-GMA 1303 stops (also referred to as a disabled state). For the G-GMA 1302, the power supply to the respective amplifiers excluding some amplifiers (Aa and A1) is cut off, thereby entering a state where a part of the operation stops.

In FIG. 2, the DA conversion unit 122 includes DA conversion circuits DA1 to DAm that respectively and individually receive the pixel data U1 to Um.

Here, each of (4*f*-3)-th (f is an integer of one or more) DA conversion circuits (DA1, DA5, DA9, . . . ) among the DA conversion circuits DA1 to DAm is coupled to the R-GMA 1301 and receives the gradation reference voltages VR0 to VR255 of the red color component. Then, each of the (4*f*-3)-th DA conversion circuits (DA1, DA5, DA9, . . . ) selects a gradation reference voltage corresponding to a luminance level represented by the pixel data U received by itself from among the gradation reference voltages VR0 to VR255 and outputs the gradation reference voltage to the output unit 123 as a gradation voltage E (4*f*-3).

In addition, each of (2*f*)-th DA conversion circuits (DA2, DA4, DA6, . . . ) among the DA conversion circuits DA1 to DAm is coupled to the G-GMA 1302 and receives the gradation reference voltages VG0 to VG255 of the green color component. Then, each of the (2*f*)-th DA conversion circuits (DA2, DA4, DA6, . . . ) selects a gradation reference voltage corresponding to a luminance level represented by the pixel data U received by itself from among the gradation reference voltages VG0 to VG255 and outputs the gradation reference voltage to the output unit 123 as a gradation voltage E (2*f*).

In addition, each of (4*f*-1)-th DA conversion circuits (DA3, DA7, DA11, . . . ) among the DA conversion circuits DA1 to DAm is coupled to the B-GMA 1303 and receives the gradation reference voltages VB0 to VB255 of the blue color component. Then, each of the (4*f*-1)-th DA conversion circuits (DA3, DA7, DA11, . . . ) selects a gradation reference voltage corresponding to a luminance level represented by the pixel data U received by itself from among the gradation reference voltages VB0 to VB255 and outputs the gradation reference voltage to the output unit 123 as a gradation voltage E(4*f*-1).

Figure 4:
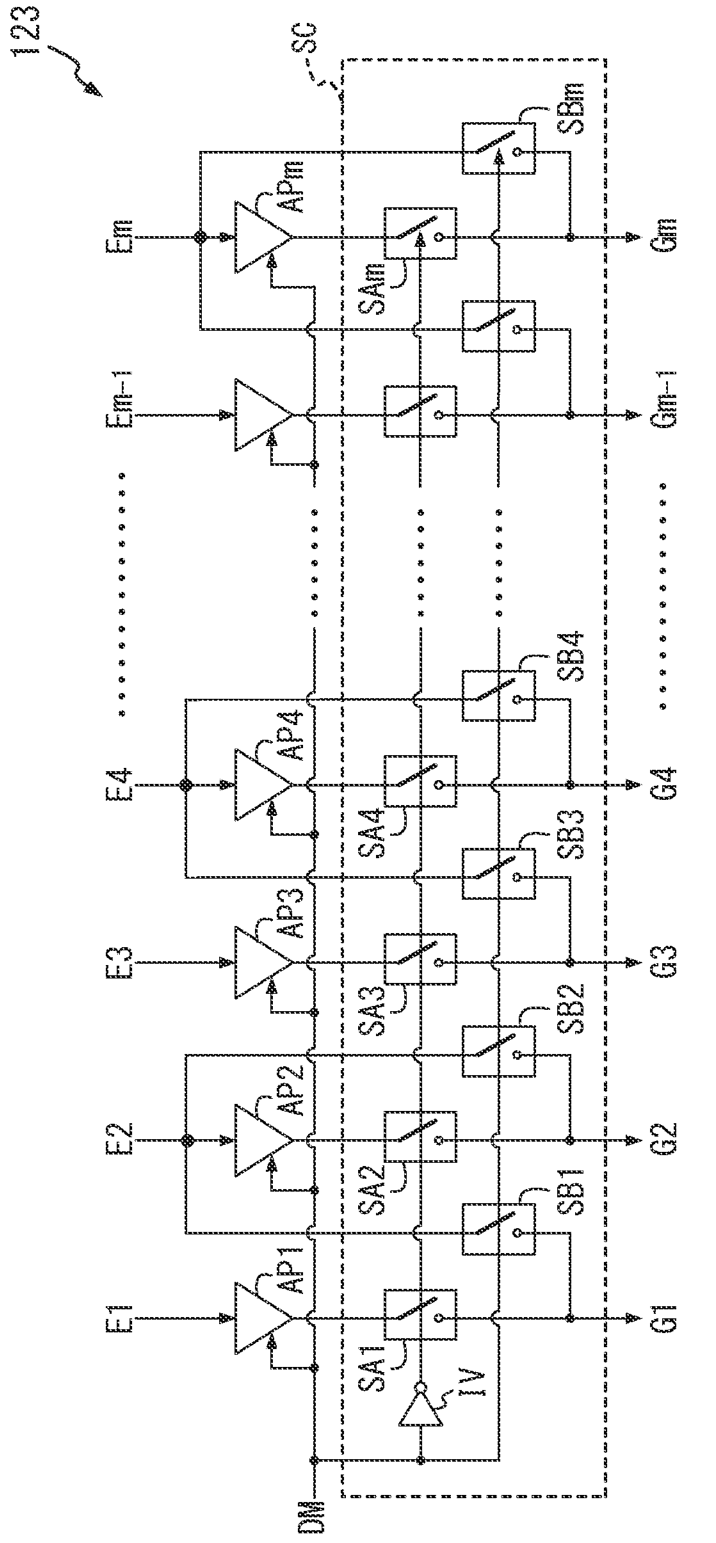
FIG. 4 is a circuit diagram illustrating an internal configuration of an output unit 123.

FIG. 4 is a circuit diagram illustrating an internal configuration of the output unit 123.

As illustrated in FIG. 4, the output unit 123 has amplifiers AP1 to APm and a switch circuit SC including an inverter IV and switches SA1 to SAm and SB1 to SBm.

The amplifiers AP1 to APm individually receive gradation voltages E1 to Em respectively output from the DA conversion circuits DA1 to DAm. The amplifiers AP1 to APm output m output voltages obtained by respectively and individually amplifying the gradation voltages E1 to Em from respective output terminals.

The switch circuit SC receives the display mode signal DM described above. The switches SA1 to SAm included in the switch circuit SC receive an inverted display mode signal obtained by inverting the logic level of the display mode signal DM by the inverter IV. When the inverted display mode signal is the logical level 0 indicating a black display, the switches SA1 to SAm uniformly enter an OFF state. On the other hand, when the inverted display mode signal is the logic level 1 indicating a normal display, all the switches SA1 to SAm enter an ON state and output a group of the output voltages respectively output from the amplifiers AP1 to APm as the driving voltage signals G1 to Gm.

The switches SB1 to SBm receive the gradation voltages E (2*f*) output from the respective (2*f*)-th DA conversion circuits (DA2, DA4, DA6, . . . ), which receive the gradation reference voltages VG0 to VG255 of the green color component, among the DA conversion circuits DA1 to DAm. When the display mode signal DM indicates a normal display, the switches SB1 to SBm uniformly enter the OFF state. On the other hand, when the display mode signal DM indicates a black display, all the switches SB1 to SBm enter the ON state and output the gradation voltages E (2*f*) as driving voltage signals G (2*f*) and G(2*f*-1).

For example, as illustrated in FIG. 4, both the switches SB1 and SB2 receive the gradation voltage E2 and enter the ON state according to the display mode signal DM indicating a black display. At this time, the switch SB1 outputs the gradation voltage E2 as the driving voltage signal G1, and the switch SB2 outputs the gradation voltage E2 as the driving voltage signal G2. Further, for example, both the switches SB3 and SB4 receive the gradation voltage E4 and enter the ON state according to the display mode signal DM indicating a black display. At this time, the switch SB3 outputs the gradation voltage E4 as the driving voltage signal G3, and the switch SB4 outputs the gradation voltage E4 as the driving voltage signal G4.

With such a configuration, when the switch circuit SC receives the display mode signal DM indicating a normal display, the switch circuit SC outputs those obtained by amplifying the gradation voltages E1 to Em supplied from the DA conversion circuits DA1 to DAm by the amplifiers AP1 to APm as the driving voltage signals G1 to Gm.

On the other hand, when the switch circuit SC receives the display mode signal DM indicating a black display, the switch circuit SC outputs the respective gradation voltages E(2*f*) output from the (2*f*)-th DA conversion circuits (DA2, DA4, DA6, . . . ), which receive the gradation reference voltages VG0 to VG255 of the green color component, among the DA conversion circuits DA1 to DAm directly as the driving voltage signals G1 to Gm. Furthermore, according to the display mode signal DM indicating a black display, each of the amplifiers AP1 to APm has its own power supply cut off.

Figure 5:
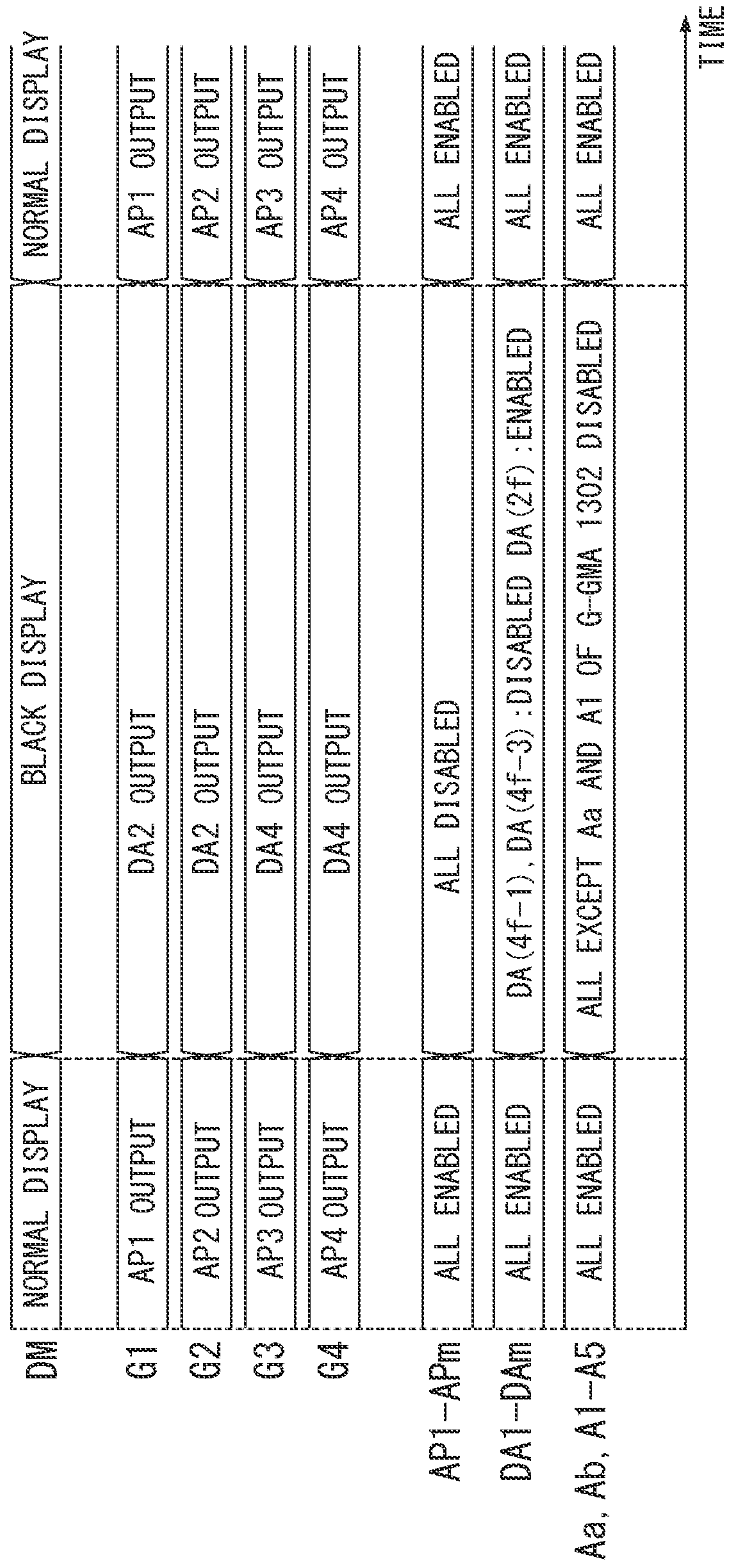
FIG. 5 is a diagram representing a transition of an internal state of each of a DA conversion unit 122, the output unit 123, and the gradation reference voltage generating unit 132 during each of a normal display and a black display.

The following describes a transition of an internal state of each of the DA conversion unit 122, the output unit 123, and the gradation reference voltage generating unit 132 during each of the normal display and the black display described above by excerpting a configuration involved in generating driving voltage signals G1 to G4 from among the driving voltage signals G1 to Gm in accordance with FIG. 5.

First, as illustrated in FIG. 5, while the display mode signal DM indicating a normal display is received, all the amplifiers AP1 to APm included in the output unit 123 are in an enabled state. During this period, all the gamma amplifiers Aa and Ab and the gamma amplifiers A1 to A5 included in the respective R-GMA 1301, G-GMA 1302, and B-GMA 1303 are in the enabled state. This causes all the DA conversion circuits DA1 to DAm included in the DA conversion unit 122 to enter the enabled state. Furthermore, while the display mode signal DM indicating a normal display is received, all the switches SA1 to SAm included in the switch circuit SC are in the ON state, and the switches SB1 to SBm are in the OFF state.

Figure 6A:
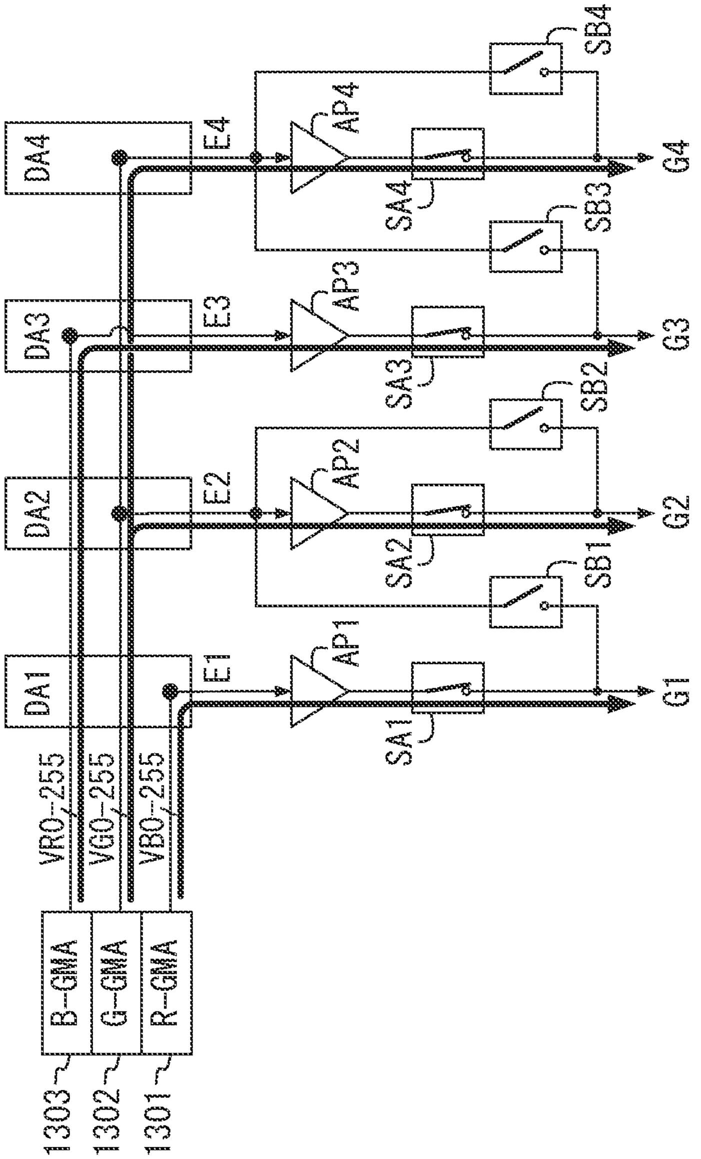
FIG. 6A is a diagram illustrating voltage transmission paths inside the DA conversion unit 122, the output unit 123, and the gradation reference voltage generating unit 132 during the normal display.

Therefore, during the normal display, as illustrated by a bold line arrow of FIG. 6A, the voltage output from the amplifier AP1 via the R-GMA 1301 as the red gamma gradation reference voltage generating circuit and the DA conversion circuit DA1 is output via the switch SA1 as the driving voltage signal G1. Further, as illustrated by a bold line arrow of FIG. 6A, the voltage output from the amplifier AP2 via the G-GMA 1302 as the green gamma gradation reference voltage generating circuit and the DA conversion circuit DA2 is output via the switch SA2 as the driving voltage signal G2. In addition, as illustrated by a bold line arrow of FIG. 6A, the voltage output from the amplifier AP3 via the B-GMA 1303 as the blue gamma gradation reference voltage generating circuit and the DA conversion circuit DA3 is output via the switch SA3 as the driving voltage signal G3. Moreover, as illustrated by a bold line arrow of FIG. 6A, the voltage output from the amplifier AP4 via the G-GMA 1302 and the DA conversion circuit DA4 is output via the switch SA4 as the driving voltage signal G4.

Next, as illustrated in FIG. 5, while the display mode signal DM indicating a black display is received, all the amplifiers AP1 to APm included in the output unit 123 are in an operation stop state (referred to as a disabled state). During this period, while the gamma amplifier Ab and the gamma amplifiers A2 to A5 included in the G-GMA 1302 are in the disabled state, all the gamma amplifiers Aa and Ab and the gamma amplifiers A1 to A5 included in the respective R-GMA 1301 and B-GMA 1303 are in the disabled state. That is, excluding the gamma amplifier Aa and the gamma amplifier A1 included in the G-GMA 1302, all the gamma amplifiers included in the respective R-GMA 1301, G-GMA 1302, and B-GMA 1303 are in the disabled state. This causes the (2*f*)-th DA conversion circuits (DA2, DA4, DA6, . . . ), which receive the gradation reference voltages VG0 to VG255 of the green color component, among the DA conversion circuits DA1 to DAm included in the DA conversion unit 122 to be in the operable enabled state during the black display. On the other hand, during this period, the (4f-3)-th DA conversion circuits (DA1, DA5, DA9, . . . ), which receive the gradation reference voltages VR0 to VR255 of the red color component and the (4f-1)-th DA conversion circuits (DA3, DA7, DA11, . . . ), which receive the gradation reference voltages VB0 to VB255 of the blue color component are in the disabled state in which the operation stops.

Furthermore, while the display mode signal DM indicating a black display is received, all the switches SA1 to SAm included in the switch circuit SC are in the OFF state, and the switches SB1 to SBm are in the ON state.

Figure 6B:
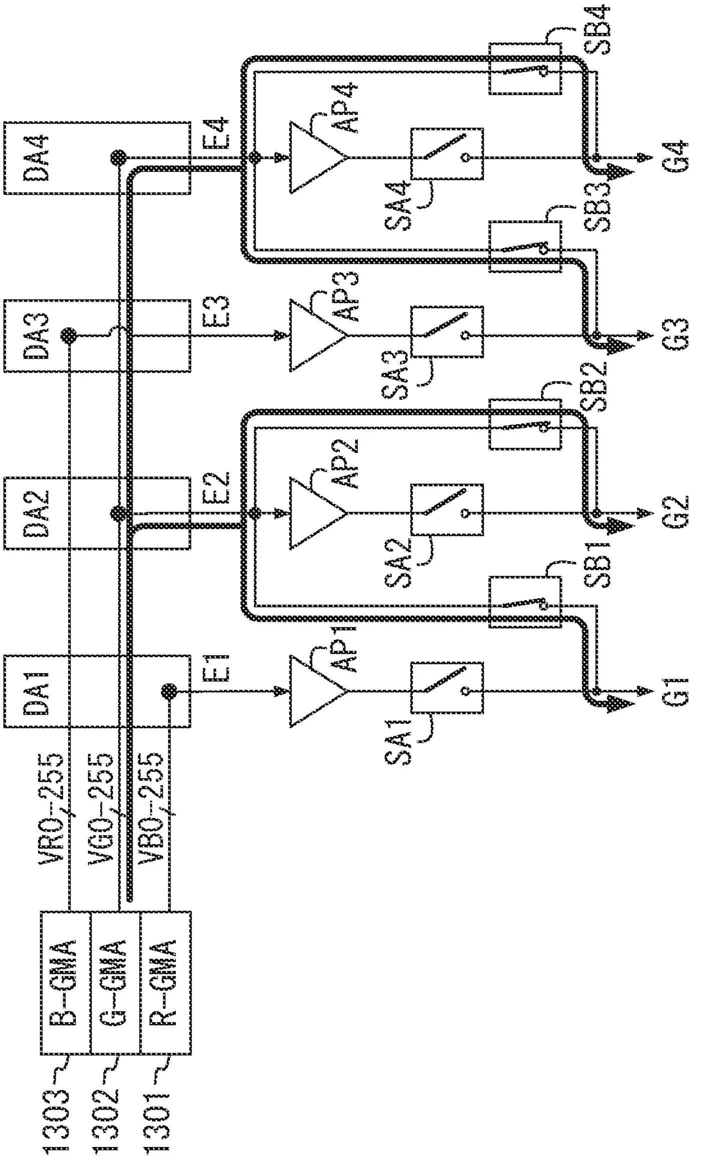
FIG. 6B is a diagram illustrating voltage transmission paths inside the DA conversion unit 122, the output unit 123, and the gradation reference voltage generating unit 132 during the black display.

With this, during the black display, as illustrated by bold line arrows of FIG. 6B, the gradation voltage E2 output from the DA conversion circuit DA2 coupled to the G-GMA 1302 as the green gamma gradation reference voltage generating circuit is output via the switches SB1 and SB2 as the driving voltage signals G1 and G2, respectively. Furthermore, during the black display, as illustrated by bold line arrows of FIG. 6B, the gradation voltage E4 output from the DA conversion circuit DA4 coupled to the G-GMA 1302 is output via the switches SB3 and SB4 as the driving voltage signals G3 and G4, respectively.

As described above in detail, when the data driver 12 receives the display mode signal DM indicating a black display, the data driver 12 supplies a gradation voltage group (E2, E4, E6, . . . ) output from a DA conversion circuit group (DA2, DA4, DA6, . . . ) coupled to the G-GMA 1302 to the display panel 20 without using the amplifiers AP1 to APm in a final stage. Furthermore, during this period, the operation of the amplifiers AP1 to APm as well as the respective R-GMA 1301 and B-GMA 1303 is forcibly stopped.

This substantially reduces the power consumption of not only the amplifiers AP1 to APm in the final stage but also the R-GMA 1301 as the red gamma gradation reference voltage generating circuit and the B-GMA 1303 as the blue gamma gradation reference voltage generating circuit when the black display is performed. In addition, when the black display is performed, for the G-GMA 1302 as the green gamma gradation reference voltage generating circuit, the operation of the other gamma amplifiers Ab and A2 to A5 excluding the gamma amplifier Aa and A1, which are involved in generating one gradation reference voltage VG0 used for performing the black display, is forcibly stopped. Therefore, the data driver 12 allows a reduction in power consumption.

In the above-described embodiment, the three systems of gradation reference voltage groups (VR0 to VR255, VG0 to VG255, and VB0 to VB255) generated by the three systems of respective gradation reference voltage generating circuits (1301 to 1303) corresponding to the red, green, and blue color components are used in the DA conversion circuits (DA1 to DAm). However, without being limited to the three systems corresponding to the red, green, and blue components, the data driver 12 may be configured to use a plurality of gradation reference voltage groups generated by a plurality of respective gradation reference voltage generating circuits corresponding to a plurality of color components of four or more colors in the DA conversion circuits.

In addition, in the above-described embodiment, when a black display is performed, only the G-GMA 1302 corresponding to the green color component among the three systems of the respective gradation reference voltage generating circuits corresponding to the red, green, and blue color components is operated. However, when a black display is performed, instead of the G-GMA 1302, only the R-GMA 1301 corresponding to the red color component or the B-GMA 1303 corresponding to the blue color component may be operated.

Moreover, in the above-described embodiment, the data driver 12 drives the display panel 20 to perform a black display or a normal display based on the video signal VS in accordance with the display mode signal DM. However, instead of this black display, another color display other than the black display, that is, a monochromatic display, may be performed.

Additionally, in the above-described embodiment, separately from a driving mode based on the display mode signal DM, a mode for further reducing the power consumption described above may be set. For example, by setting this mode to configure such that a signal for putting all the gamma amplifiers into a disabled state can be input, the power consumption of the gradation reference voltage generating unit 132 and the data driver 12 including the gradation reference voltage generating unit 132 can be further reduced.

Basically, as the display driver according to the disclosure, it is only necessary to include a plurality of gradation reference voltage generating circuits, first to m-th (m is an integer of three or more) DA conversion circuits, first to m-th amplifiers, and a switch circuit described below.

The plurality of gradation reference voltage generating circuits (1301 to 1303) each generate a voltage group according to gamma correction characteristics of a different color component as a gradation reference voltage group (VR0 to VR255, VG0 to VG255, and VB0 to VB255).

Each of the first to m-th DA conversion circuits (DA1 to DAm) is coupled to one gradation reference voltage generating circuit among the above-described plurality of gradation reference voltage generating circuits, selects a gradation reference voltage corresponding to a luminance level represented by a pixel data piece from the gradation reference voltage group generated by the gradation reference voltage generating circuit coupled to each of the first to m-th DA conversion circuits itself, and outputs the gradation reference voltage as a gradation voltage (E1 to Em).

Each of the first to m-th amplifiers (AP1 to APm) outputs a voltage obtained by individually amplifying the gradation voltage (E1 to Em) output from each of the first to m-th DA conversion circuits (DAL to DAm) as an output voltage.

The switch circuit (SA1 to SAm and SB1 to SBm) receives an output voltage group constituted of the output voltage output from each of the first to m-th amplifiers and a gradation voltage group constituted of the gradation voltage generated by each of DA conversion circuits, which are coupled to a specific gradation reference voltage generating circuit (such as 1302) among the above-described plurality of gradation reference voltage generating circuits, among the first to m-th DA conversion circuits. Furthermore, the switch circuit receives a display mode signal (DM) indicating a monochromatic display (such as a black display) or a normal display and outputs the output voltage group output from the first to m-th amplifiers to a plurality of data lines (D1 to Dm) of a display panel (20) when this display mode signal indicates the normal display. Meanwhile, the switch circuit outputs the gradation voltage group generated by each of the DA conversion circuits coupled to the specific gradation reference voltage generating circuit to the plurality of data lines of the display panel when the display mode signal indicates the monochromatic display. Here, when the display mode signal indicates the monochromatic display, the operation of the first to m-th amplifiers is stopped, and the operation of each gradation reference voltage generating circuit excluding the specific gradation reference voltage generating circuit from among the plurality of gradation reference voltage generating circuits is stopped.

Figure 7:
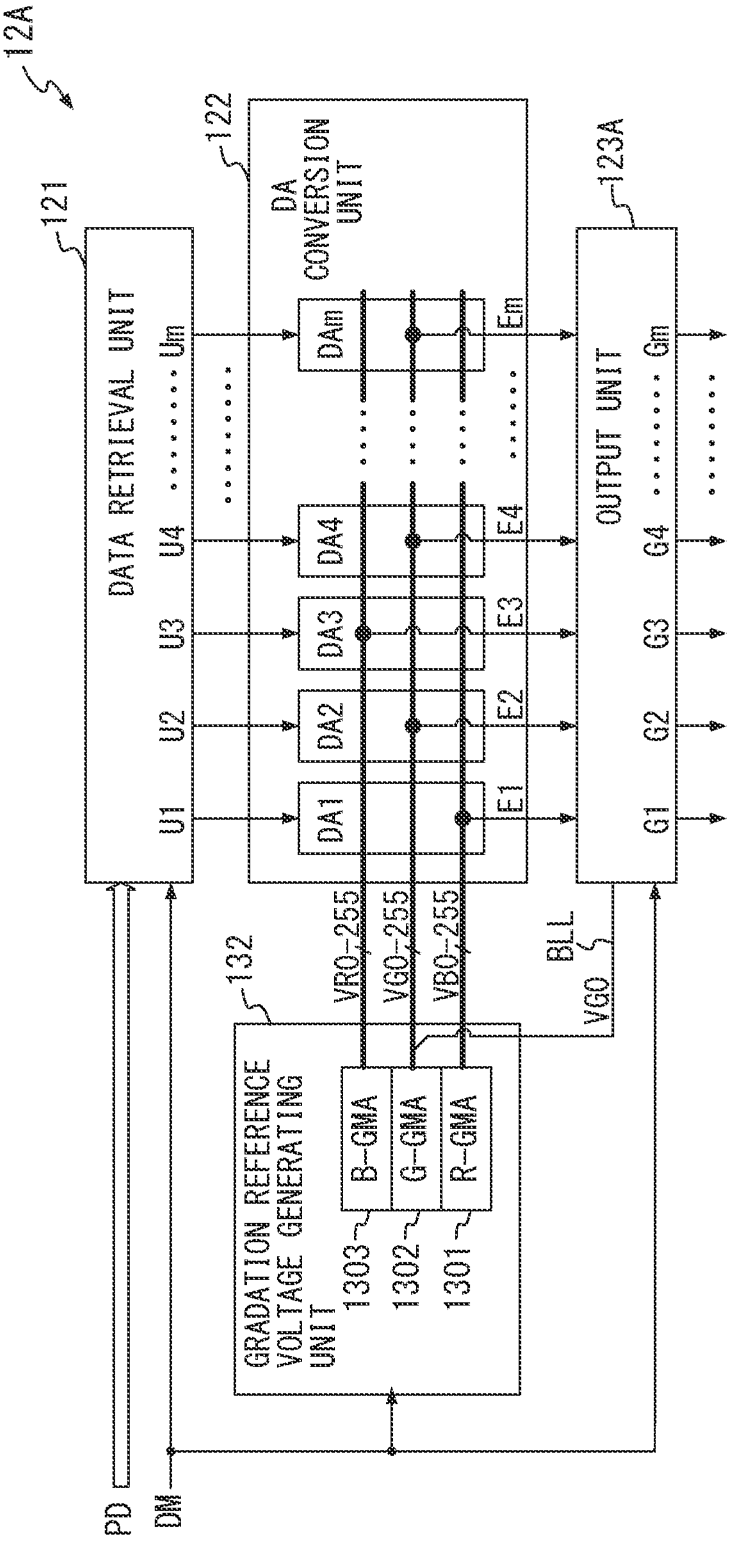
FIG. 7 is a block diagram illustrating an internal configuration of a data driver 12A as a modification of the data driver 12.

FIG. 7 is a block diagram illustrating a configuration of a data driver 12A as a modification of the data driver 12 illustrated in FIG. 1.

In the configuration illustrated in FIG. 7, except that an output unit 123A is employed instead of the output unit 123, and the gradation reference voltage VG0 among the gradation reference voltages VG0 to VG255 generated by the G-GMA 1302 is supplied to the output unit 123A via a wiring BLL, the other configuration is the same as that illustrated in FIG. 2.

Figure 8:
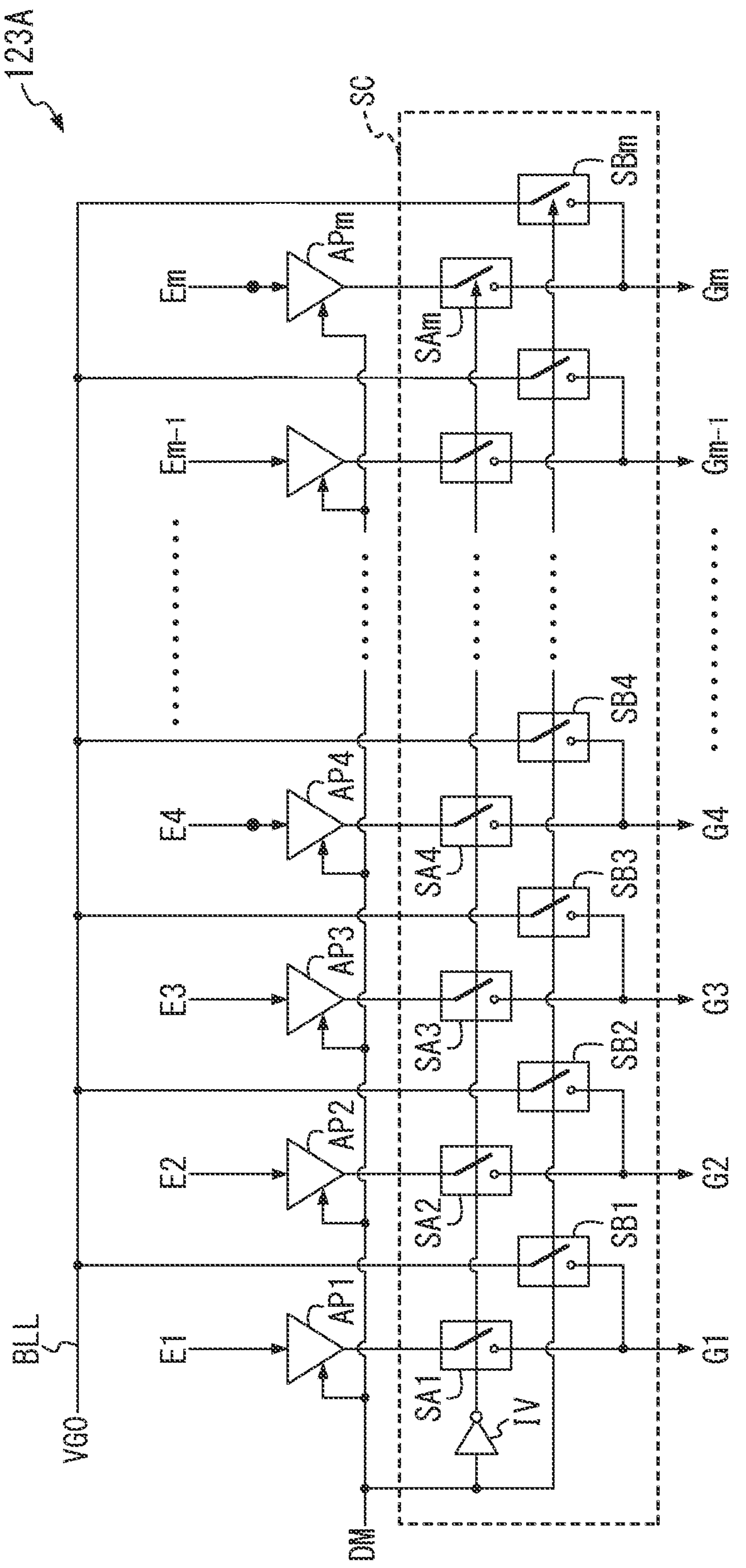
FIG. 8 is a circuit diagram illustrating an internal configuration of an output unit 123A.

FIG. 8 is a circuit diagram illustrating a configuration of the output unit 123A.

As illustrated in FIG. 8, similarly to the output unit 123, the output unit 123A has the amplifiers AP1 to APm that individually amplify the gradation voltages E1 to Em and the switch circuit SC including the switches SA1 to SAm and SB1 to SBm.

However, in the output unit 123A, the switches SB1 to SBm are coupled not to DA conversion circuits DA (2*f*) but to the wiring BLL that transmits the gradation reference voltage VG0.

With this, when the display mode signal DM indicates a black display, the output unit 123A outputs the gradation reference voltage VG0 generated by the G-GMA 1302 as the driving voltage signals G1 to Gm via the wiring BLL and the switches SB1 to SBm without using the DA conversion circuits. Note that the other configuration and operation are the same as those illustrated in FIG. 4.

Basically, as the data driver 12A, it is only necessary to include a wiring (BLL), which transmits a predetermined gradation reference voltage (such as VG0) in a gradation reference voltage group generated by a specific gradation reference voltage generating circuit (such as 1302) among a plurality of gradation reference voltage generating circuits, together with a plurality of gradation reference voltage generating circuits (1301 to 1303), first to m-th (m is an integer of three or more) DA conversion circuits, first to m-th amplifiers, and a switch circuit as described below.

The plurality of gradation reference voltage generating circuits (1301 to 1303) each generate a voltage group according to gamma correction characteristics of a different color component as a gradation reference voltage group (VR0 to VR255, VG0 to VG255, and VB0 to VB255).

Each of the first to m-th DA conversion circuits (DA1 to DAm) is coupled to one gradation reference voltage generating circuit among the above-described plurality of gradation reference voltage generating circuits, selects a gradation reference voltage corresponding to a luminance level represented by a pixel data piece from the gradation reference voltage group generated by the gradation reference voltage generating circuit coupled to each of the first to m-th DA conversion circuits itself, and outputs the gradation reference voltage as a gradation voltage (E1 to Em).

Each of the first to m-th amplifiers (AP1 to APm) outputs a voltage obtained by individually amplifying the gradation voltage output from each of the first to m-th DA conversion circuits as an output voltage.

The switch circuit (SA1 to SAm and SB1 to SBm) receives an output voltage group constituted of the output voltage output from each of the first to m-th amplifiers and the predetermined gradation reference voltage (VR0) received via the above-described wiring (BLL). Furthermore, the switch circuit receives a display mode signal (DM) indicating a monochromatic display or a normal display and outputs the output voltage group output from the first to m-th amplifiers to a plurality of data lines (D1 to Dm) of a display panel (20) when this display mode signal indicates the normal display. Meanwhile, the switch circuit outputs the predetermined gradation reference voltage (VR0) received via the above-described wiring to the plurality of data lines of the display panel when the display mode signal indicates the monochromatic display. Here, when the display mode signal indicates the monochromatic display, the operation of the first to m-th amplifiers is stopped, and the operation of each gradation reference voltage generating circuit excluding the specific gradation reference voltage generating circuit from among the plurality of gradation reference voltage generating circuits is stopped.

With such a configuration, the data driver 12A allows lower power consumption similarly to the data driver 12 and reduces impedance from a gradation reference voltage generating circuit (such as the G-GMA 1302) until the driving voltage signals G1 to Gm are output. This allows an enhancement in drive capability during a black display.

It is understood that the foregoing description and accompanying drawings set forth the preferred embodiments of the disclosure at the present time. Various modifications, additions and alternative designs will, of course, become apparent to those skilled in the art in light of the foregoing teachings without departing from the spirit and scope of the disclosure. Thus, it should be appreciated that the disclosure is not limited to the disclosed Examples but may be practiced within the full scope of the appended claims.

What is claimed is:

1. A display driver that drives a display panel including a plurality of data lines according to a pixel data piece representing a luminance level of each pixel based on a video signal, the display driver comprising:

a plurality of gradation reference voltage generating circuits that each generate a voltage group according to gamma correction characteristics of a different color component as a gradation reference voltage group;

first to m-th (m is an integer of three or more) DA conversion circuits each coupled to one gradation reference voltage generating circuit among the plurality of gradation reference voltage generating circuits, each of the first to m-th DA conversion circuits selecting a gradation reference voltage corresponding to a luminance level represented by the pixel data piece from a gradation reference voltage group and outputting the gradation reference voltage as a gradation voltage, the gradation reference voltage group being generated by the gradation reference voltage generating circuit coupled to each of the first to m-th DA conversion circuits itself;

first to m-th amplifiers that each output a voltage obtained by individually amplifying the gradation voltage output from each of the first to m-th DA conversion circuits as an output voltage; and a switch circuit that receives an output voltage group, a gradation voltage group, and a display mode signal, the output voltage group being constituted of the output voltage output from each of the first to m-th amplifiers, the gradation voltage group being constituted of the gradation voltage output from each of DA conversion circuits among the first to m-th DA conversion circuits, the DA conversion circuits being coupled to a specific gradation reference voltage generating circuit among the plurality of gradation reference voltage generating circuits, the display mode signal indicating a monochromatic display or a normal display, the switch circuit outputting the output voltage group to the plurality of data lines of the display panel when the display mode signal indicates the normal display, the switch circuit outputting the gradation voltage group to the plurality of data lines of the display panel with bypassing of the amplifiers when the display mode signal indicates the monochromatic display, wherein when the display mode signal indicates the monochromatic display, operation of the first to m-th amplifiers and each gradation reference voltage generating circuit excluding the specific gradation reference voltage generating circuit from among the plurality of gradation reference voltage generating circuits is stopped.

2. The display driver according to claim 1, wherein each of the plurality of gradation reference voltage generating circuits includes a ladder resistor that obtains the gradation voltage group and a plurality of gamma amplifiers that apply voltages to the ladder resistor, and when the display mode signal indicates the monochromatic display, a power supply of the plurality of gamma amplifiers included in each gradation reference voltage generating circuit excluding the specific gradation reference voltage generating circuit from among the plurality of gradation reference voltage generating circuits is cut off.

3. The display driver according to claim 2, wherein when the display mode signal indicates the monochromatic display, a power supply of each gamma amplifier excluding a gamma amplifier involved in generating a predetermined gradation reference voltage from among the plurality of gamma amplifiers included in the specific gradation reference voltage generating circuit is cut off.

4. The display driver according to claim 1, wherein the plurality of gradation reference voltage generating circuits include:

a red gamma gradation reference voltage generating circuit that generates a gradation reference voltage group according to a gamma correction characteristic of a red color component;

a green gamma gradation reference voltage generating circuit that generates a gradation reference voltage group according to a gamma correction characteristic of a green color component; and a blue gamma gradation reference voltage generating circuit that generates a gradation reference voltage group according to a gamma correction characteristic of a blue color component, wherein the specific gradation reference voltage generating circuit is the green gamma gradation reference voltage generating circuit.

5. A display driver that drives a display panel including a plurality of data lines according to a pixel data piece representing a luminance level of each pixel based on a video signal, the display driver comprising:

a plurality of gradation reference voltage generating circuits that each generate a voltage group according to gamma correction characteristics of a different color component as a gradation reference voltage group;

first to m-th (m is an integer of three or more) DA conversion circuits each coupled to one gradation reference voltage generating circuit among the plurality of gradation reference voltage generating circuits, each of the first to m-th DA conversion circuits selecting a gradation reference voltage corresponding to a luminance level represented by the pixel data piece from a gradation reference voltage group and outputting the gradation reference voltage as a gradation voltage, the gradation reference voltage group being generated by the gradation reference voltage generating circuit coupled to each of the first to m-th DA conversion circuits itself;

first to m-th amplifiers that each output a voltage obtained by individually amplifying the gradation voltage output from each of the first to m-th DA conversion circuits as an output voltage;

a wiring that transmits a predetermined gradation reference voltage of the gradation reference voltage group generated by a specific gradation reference voltage generating circuit among the plurality of gradation reference voltage generating circuits; and a switch circuit that receives an output voltage group, the predetermined gradation reference voltage received via the wiring, and a display mode signal, the output voltage group being constituted of the output voltage output from each of the first to m-th amplifiers, the display mode signal indicating a monochromatic display or a normal display, the switch circuit outputting the output voltage group to the plurality of data lines of the display panel when the display mode signal indicates the normal display, the switch circuit outputting the predetermined gradation reference voltage received via the wiring to the plurality of data lines of the display panel with bypassing of the amplifiers when the display mode signal indicates the monochromatic display, wherein when the display mode signal indicates the monochromatic display, operation of the first to m-th amplifiers and each gradation reference voltage generating circuit excluding the specific gradation reference voltage generating circuit from among the plurality of gradation reference voltage generating circuits is stopped.

6. A display apparatus comprising:

a display panel including a plurality of data lines; and a display driver that drives the display panel according to a pixel data piece representing a luminance level of each pixel based on a video signal, wherein the display driver includes:

a plurality of gradation reference voltage generating circuits that each generate a voltage group according to gamma correction characteristics of a different color component as a gradation reference voltage group;

first to m-th (m is an integer of three or more) DA conversion circuits each coupled to one gradation reference voltage generating circuit among the plurality of gradation reference voltage generating circuits, each of the first to m-th DA conversion circuits selecting a gradation reference voltage corresponding to a luminance level represented by the pixel data piece from a gradation reference voltage group and outputting the gradation reference voltage as a gradation voltage, the gradation reference voltage group being generated by the gradation reference voltage generating circuit coupled to each of the first to m-th DA conversion circuits itself;

first to m-th amplifiers that each output a voltage obtained by individually amplifying the gradation voltage output from each of the first to m-th DA conversion circuits as an output voltage; and a switch circuit that receives an output voltage group, a gradation voltage group, and a display mode signal, the output voltage group being constituted of the output voltage output from each of the first to m-th amplifiers, the gradation voltage group being constituted of the gradation voltage output from each of DA conversion circuits among the first to m-th DA conversion circuits, the DA conversion circuits being coupled to a specific gradation reference voltage generating circuit among the plurality of gradation reference voltage generating circuits, the display mode signal indicating a monochromatic display or a normal display, the switch circuit outputting the output voltage group to the plurality of data lines of the display panel when the display mode signal indicates the normal display, the switch circuit outputting the gradation voltage group to the plurality of data lines of the display panel with bypassing of the amplifiers when the display mode signal indicates the monochromatic display, wherein when the display mode signal indicates the monochromatic display, operation of the first to m-th amplifiers and each gradation reference voltage generating circuit excluding the specific gradation reference voltage generating circuit from among the plurality of gradation reference voltage generating circuits is stopped.

* * * * *